United States Patent
Garcia Garcia et al.

(10) Patent No.: US 10,321,019 B2
(45) Date of Patent: Jun. 11, 2019

(54) METHOD AND SYSTEM FOR PROVIDING A SELF-ADAPTIVE IMAGE

(71) Applicant: HEWLETT-PACKARD DEVELOPMENT COMPANY, L.P., Houston, TX (US)

(72) Inventors: Luis Garcia Garcia, Barcelona (ES); Alex Andrea Tallada, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 115 days.

(21) Appl. No.: 15/113,585

(22) PCT Filed: Jan. 30, 2014

(86) PCT No.: PCT/US2014/013899
§ 371 (c)(1),
(2) Date: Oct. 20, 2016

(87) PCT Pub. No.: WO2015/116109
PCT Pub. Date: Aug. 6, 2015

(65) Prior Publication Data
US 2017/0034398 A1 Feb. 2, 2017

(51) Int. Cl.
*H04N 1/60* (2006.01)
*H04N 1/54* (2006.01)
*H04N 1/00* (2006.01)

(52) U.S. Cl.
CPC ....... *H04N 1/6086* (2013.01); *H04N 1/00023* (2013.01); *H04N 1/00034* (2013.01); *H04N 1/00058* (2013.01); *H04N 1/00082* (2013.01); *H04N 1/54* (2013.01); *H04N 1/603* (2013.01)

(58) Field of Classification Search
CPC .................................................... H04N 1/6086
See application file for complete search history.

(56) References Cited

U.S. PATENT DOCUMENTS

| 5,240,818 | A | * | 8/1993 | Mignardi | G09F 9/372 359/855 |
|---|---|---|---|---|---|
| 7,259,898 | B2 | | 8/2007 | Khazova et al. | |
| 8,345,038 | B2 | | 1/2013 | Kerofsky | |
| 2002/0011786 | A1 | * | 1/2002 | Murasko | G09F 13/22 313/518 |
| 2003/0167947 | A1 | | 9/2003 | Lynn | |
| 2004/0021705 | A1 | | 2/2004 | Baker et al. | |

(Continued)

FOREIGN PATENT DOCUMENTS

| CN | 102203680 | 9/2011 |
|---|---|---|
| KR | 20130110121 | 10/2013 |
| WO | WO-2010050946 | 5/2010 |

OTHER PUBLICATIONS

Three Square Technology Ltd. AGFA Graphics Asia. Anapurna M1600. Retrieved on Sep. 10, 2013.

*Primary Examiner* — King Y Poon
*Assistant Examiner* — Michael Burleson
(74) *Attorney, Agent, or Firm* — HP Inc. Patent Department (57) ABSTRACT

Implementations disclose a method and system for providing a self-adaptive image. According to one implementation, a first non-white ink layer on is deposited on a substrate. Furthermore, a white ink layer is deposited over the first non-white ink layer and below a second non-white ink layer deposited thereon.

16 Claims, 5 Drawing Sheets

(56) References Cited

U.S. PATENT DOCUMENTS

| | | |
|---|---|---|
| 2005/0122517 A1 | 6/2005 | Inoue |
| 2005/0259282 A1 | 11/2005 | Takano et al. |
| 2006/0158473 A1 | 7/2006 | Mills |
| 2008/0130023 A1 | 6/2008 | Perez et al. |
| 2010/0103187 A1 | 4/2010 | Linssen |
| 2011/0129149 A1 | 6/2011 | Kang |
| 2011/0261094 A1 | 10/2011 | Ruckmongathan |
| 2012/0076999 A1* | 3/2012 | Nakano ............... B41M 3/008 428/203 |
| 2013/0181435 A1* | 7/2013 | Hersch ............... H04N 1/6058 283/85 |
| 2013/0241988 A1 | 9/2013 | Mills |
| 2013/0264813 A1* | 10/2013 | Quinn ............... B41M 3/10 283/67 |
| 2016/0299347 A1* | 10/2016 | Petrov ............... G02B 5/1809 |

* cited by examiner

METHOD AND SYSTEM FOR PROVIDING A SELF-ADAPTIVE IMAGE

BACKGROUND

Advertising is an essential means for companies to promote their products and services. Today, businesses often spend north of hundreds of millions of dollars per year on various marketing campaigns. The signage market is dominated by various-sized advertisements as companies seek appropriate signs that will have the maximum impact on potential consumers. One such signage includes backlit posters that allow content to be displayed twenty-four hours a day. More particularly, these backlit posters are displayed within a light box during the day with the light off in order to save energy and then with rear illumination during the evening to reach the nighttime audience.

BRIEF DESCRIPTION OF THE DRAWINGS

The features and advantages of the present disclosure as well as additional features and advantages thereof will be more clearly understood hereinafter as a result of a detailed description of implementations when taken in conjunction with the following drawings in which.

DETAILED DESCRIPTION OF THE INVENTION

The following discussion is directed to various examples. Although one or more of these examples may be discussed in detail, the implementations disclosed should not be interpreted, or otherwise used, as limiting the scope of the disclosure, including the claims. In addition, one skilled in the art will understand that the following description has broad application, and the discussion of any implementations is meant only to be an example of one implementation, and not intended to intimate that the scope of the disclosure, including the claims, is limited to that implementation. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

In general, the color characterization of a printed image varies greatly depending on the illumination type. For example, typically images characterized for front-lit applications tend to display pale colors when viewed using a back light. On the other hand, images characterized for backlit illumination (i.e., uses more ink to saturate colors during rear illumination) produce darker graphics when displayed in natural light (i.e., front illumination). Prior attempts to resolve this issue include printing with a synthetic profile designed with a mix of both illuminations (i.e., backlit and frontlit). However, this is more of an intermediate solution that provides an image not optimized for either lighting condition, and though acceptable, is often slightly darker during the day and slightly paler during the night. This is partly because images viewed while light reflects on the display surface have more saturated colors as the light gets colored twice due to multiples pass through the ink layer, while images viewed from rear lighting (i.e., backlit) have paler colors as light only passes once through the ink layer.

Still another solution involves printing one image on a substrate and then printing the same image again mirrored on the back side of the same substrate such that both images are aligned. However, this method requires a very precise alignment between both sides of the substrate and also requires multiple print operations, which directly impacts throughput, and is not valid in most roll to roll applications since alignment errors tends to accumulate across the entire length of the ink roll. While it is possible to find an ink amount that works for both illumination modes accepting some performance tradeoffs, there is still a need in the art for a robust solution that optimizes the image for both viewing conditions.

Implementations of the present disclosure enable a method and system for providing a self-adaptive image. According to one example, a layer of white ink is deposited between a first and second ink layer printed on a substrate. Consequently, only the top part of the image is seen using a front light while the effect on bottom part of the image is negligible. Moreover, when using a back light the bottom part of the image reinforces the color avoiding the pale aspect of prior solutions. Still further, both layers of the image can be color-managed independently to optimize both viewing conditions.

Figure 1:
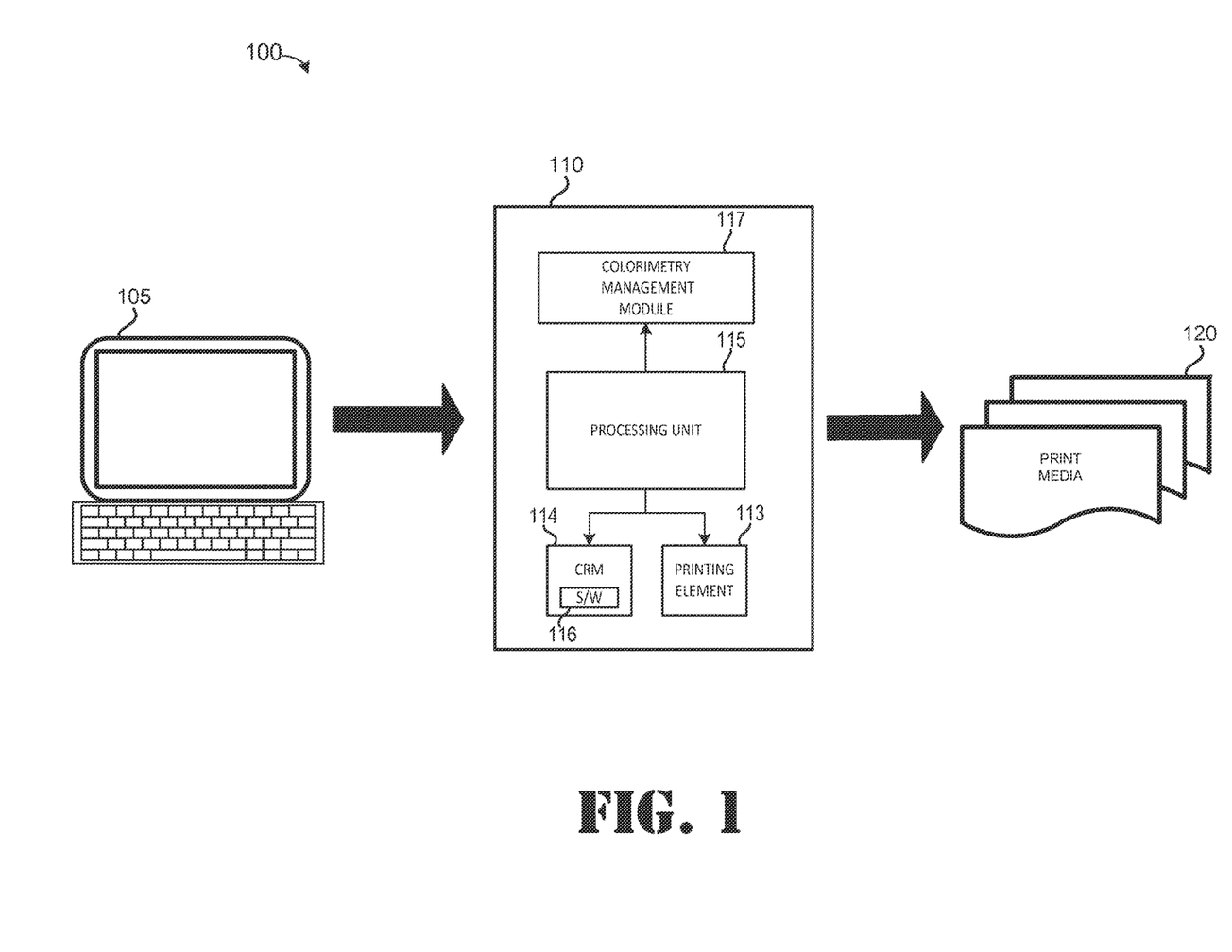
FIG. 1 illustrates a simplified block diagram of the self-adaptive image system according to an example implementation.

Referring now in more detail to the drawings in which like numerals identify corresponding parts throughout the views, FIG. 1 illustrates a simplified block diagram of the self-adaptive image system according to an example implementation. As shown in the present example, the system 100 includes a user 105, printer system 110, and print media 120.

User 105 represents an individual operating a computing device capable of communicating with the printer system 110. According to one implementation, the user and computing device 105 may include a notebook computer, tablet computing device, smartphone, or similar device having features to communicate (wired or wirelessly) with a peripheral device such as printer 110. Print media or substrate 125 represents paper, poster, cardboard, or similar material used by the printing device 110 for embedding text and/or graphics thereon.

According to one implementation, printing system 110 represents a commercial, laserjet, or large-format printer configured to print images on a print media 125. In one example, the printer includes printing element 113, processing unit 115, and colorimetry management module 117. The printing element 113 represents an ink delivery device for depositing ink (white and non-white) onto print media 125. Processing unit 112 represents a central processing unit (CPU), microcontroller, microprocessor, or logic configured to analyze and execute programming instructions associated with the colorimetry management module 117. Storage medium 114 represents volatile storage (e.g. random access memory), non-volatile store (e.g. hard disk drive, read-only memory, compact disc read only memory, flash storage, etc.), or combinations thereof. Furthermore, storage medium 114 includes firmware or software 116 that is executable by processor 115 and, that when executed, causes the processing unit 115 to perform some or all of the functionality described herein. Moreover, the colorimetry management module 117 may be implemented as an executable programming module or firmware within the storage medium 114.

In one example, the colorimetry management module 117 is configured to provide optimized color attributes and profiles for each non-white layer to be printed. For instance, the colorimetry management module 117 may provide instructions to the processing unit to utilize a first optimized color profile setting for the lower ink layer and a second optimized color profile setting for the upper ink layer as will be described in further detail below. The color profile settings for each ink layer may represent a set of data that characterizes a color space input and may be in accordance with standards of the International Color Consortium (e.g. ICC profile). The management module 117 may further include an element for measuring color attributes of an image such as spectrophotometer for example in order to establish the proper color settings for each layer of the image. According to one example, elements of the colorimetry management module 110 *m* implemented as upgradeable firmware for execution within existing print systems.

Figure 2:
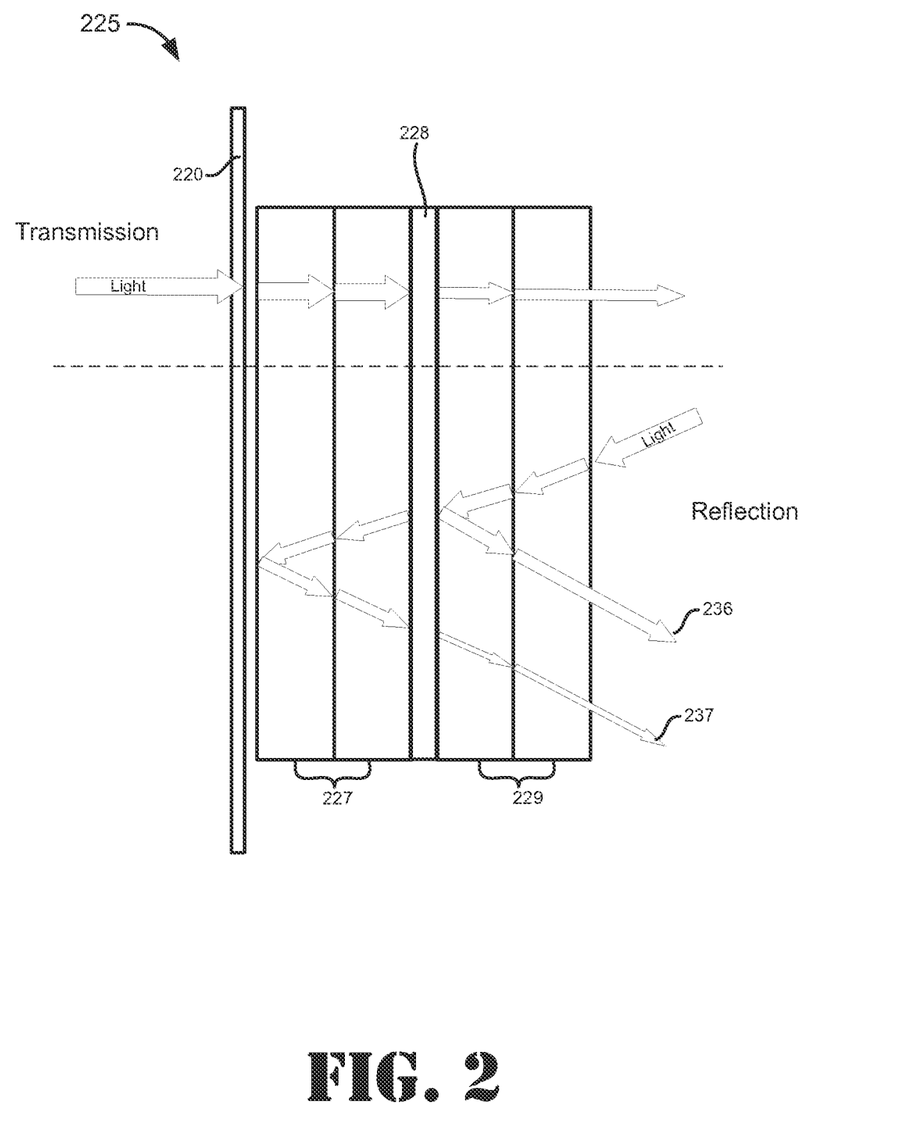
FIG. 2 illustrates a side profile view of the self-adaptive image and layer construction according to an example implementation.

FIG. 2 is a side profile view of the self-adaptive image and layer construction according to an example implementation. The print output 225 includes print substrate 220 having multiple ink layers deposited thereon. The multi-layered ink structure includes a bottom image layer 227, white layer 228, and an upper image layer 229. The directional arrows represent how light gets colored in both transmission mode (backlit) and reflection mode (frontlit). As shown here, the white layer 228 reflects most of the light while only transmitting a fraction of the incoming light. Furthermore, each non-white image layer 227 and 229 provides ample color with respect to the input light during backlit illumination (i.e., transmission mode). And during front light illumination (i.e., reflection mode), the upper image layer 229 provides the majority of color light input (represented by magnitude directional arrow 236) as the light-color contribution from the bottom image layer 229 is negligible (represented by magnitude directional arrow 237).

Moreover, the color can be optimized for both lighting conditions by determining an appropriate ink level for each non-white image layer (upper layer 229 and bottom layer 227). In one example, a total non-white ink amount of 200% is distributed onto the image layers at an ink level ratio of 1:1 such that each layer 227 and 229 receive an ink level of 100%. Still further, accurate colors can be established by applying a different color profiles for each image layer 227 and 229 as will be described in further detail with reference to FIG. 5.

Figure 3:
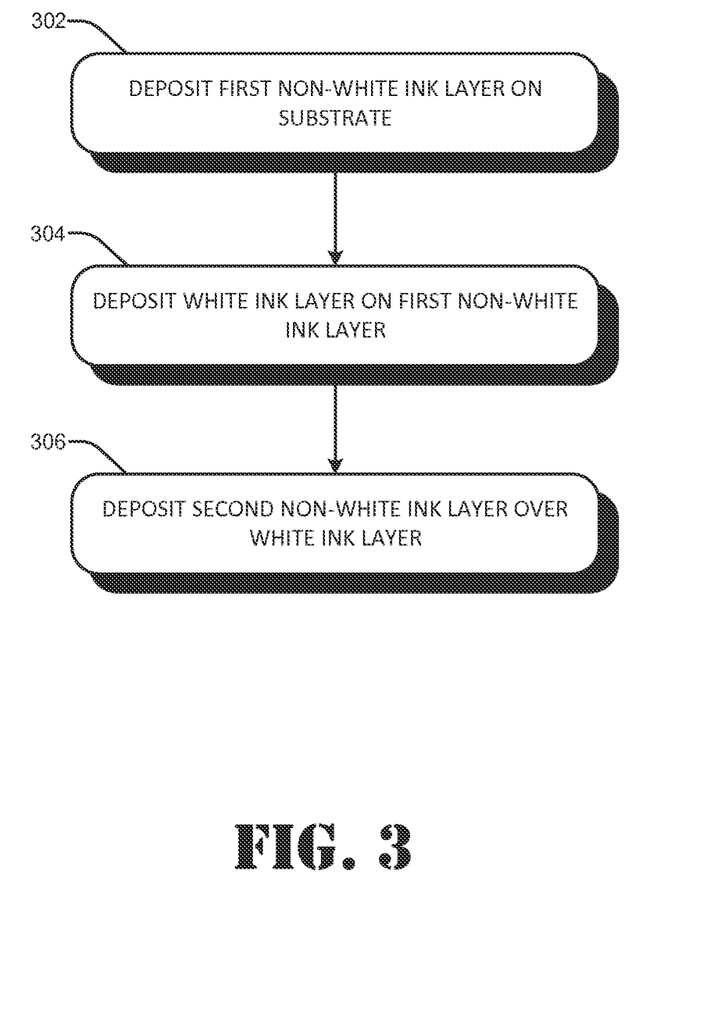
FIG. 3 illustrates a simplified flow chart of the processing steps for printing a self-adaptive image according to an example implementation.

FIG. 3 illustrates a simplified flow chart of the processing steps for printing a self-adaptive image according to an example implementation. Initially, in block 302 a first non-white ink layer associated with an image to be printed is deposited on the substrate. For example, a user operating a computing device may send a print job of an image to be printed to the printer device so as to cause the printer device to execute instructions from the processing unit to deposit a first non-white ink layer. Thereafter, instructions for depositing a white ink layer above the first non-white ink layer is sent in block 304. Lastly, instructions are transmitted for the printing element of the print device to deposit a second non-white layer associated the image to be printed above the white ink layer in block 306.

Figure 4:
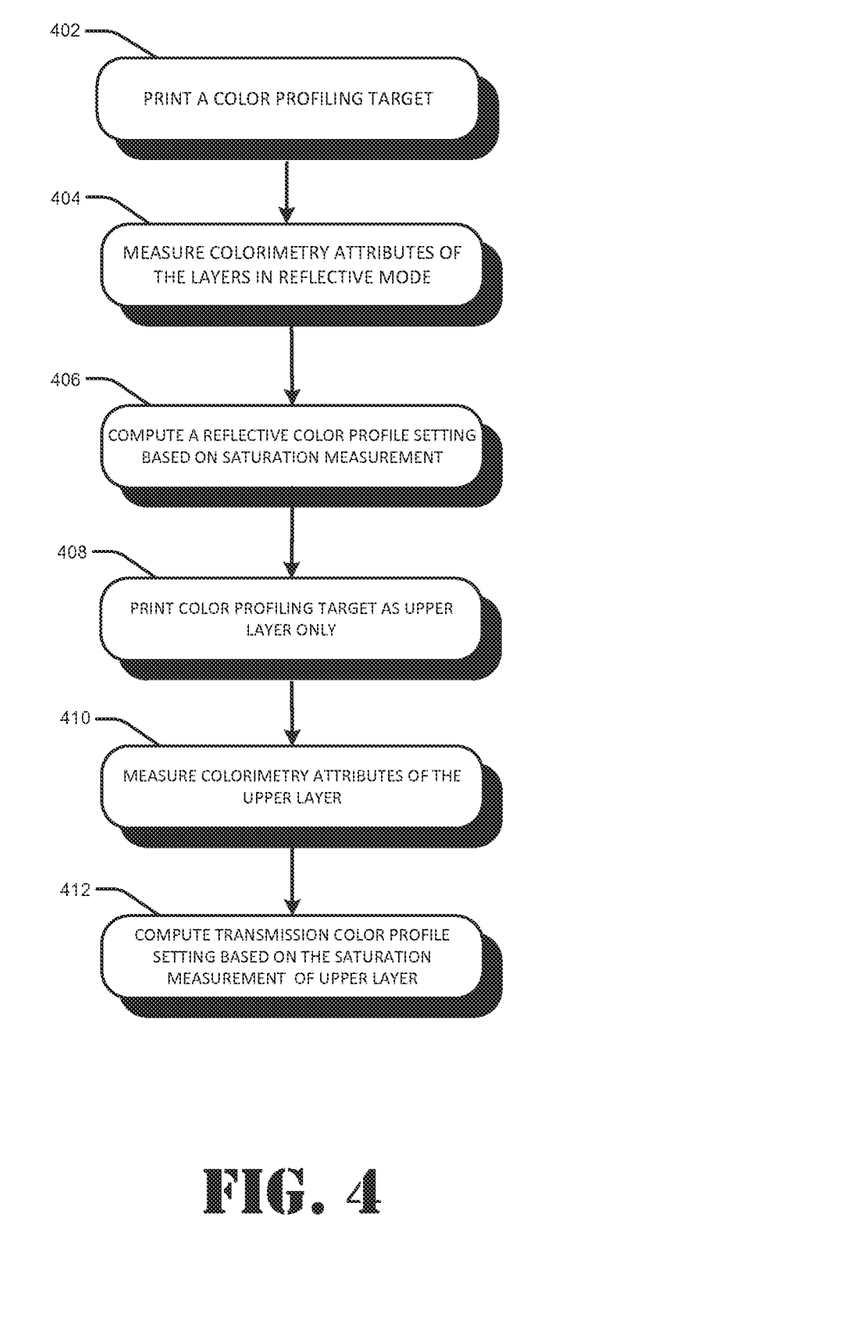
FIG. 4 illustrates a simplified flow chart for calibrating color attributes of the self-adaptive image according to an example implementation.

FIG. 4 illustrates a simplified flow chart for calibrating color attributes of the self-adaptive image according to an example implementation. As mentioned above, application of varying color profiles for the image layers aids in providing the most accurate color for the printed image. In block 402, a first target color profile sample is printed by the print device. In block 404, the colorimetry attributes of the printed sample are measured while in reflection mode. In one example, a spectrophotometer associated with the printer device may be utilized to measure colorimetry factors such as the saturation, color brightness, hue, and other color attributes of the printed profile sample. Next, in block 406, a color profile setting for the upper ink layer (i.e., reflection color profile) is computed based on the colorimetry measurement so as to ensure that the most accurate colors appear during frontlit illumination. The color profile setting may relate generally to color management within a specific color space (e.g., RGB and CMYX) for the print device and print element during deposition of link on the substrate. For example, the colorimetry management module may determine that the lower ink layer should be printed with darker have a Thereafter, in block 408 a second color profile sample is printed as a lower ink layer while the first color profile sample is printed as an upper layer. In block 410, the colorimetry attributes of the second color profile sample is then measured while backlit illuminated. The print color profile setting for the lower ink layer (i.e., transmission color profile) is computed in block 412 so as to optimize the colorimetry attributes of the image during the backlit illumination condition.

Figure 5:
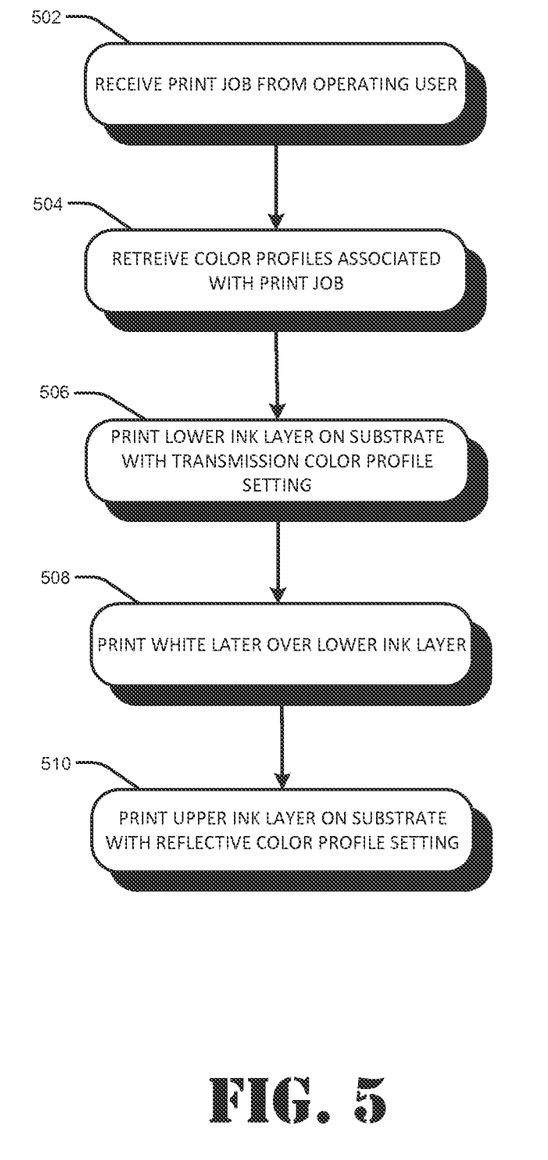
FIG. 5 illustrates another simplified flow chart of the processing steps for printing a self-adaptive image according to an example implementation.

FIG. 5 illustrates another simplified flow chart of the processing steps for printing a self-adaptive image according to an example implementation. First, in block 502 a print job from an operating user is received at the printer device. Furthermore, the processing unit of the printer device is configured to retrieve the color profiles associated with the print function in block 504. Based on the profile setting (i.e., transmission or reflective), a lower ink layer is printed on the substrate in accordance with the colorimetry attributes associated with the transmission profile in block 506. For example, the lower ink layer may be printed with slightly darker ink since less light is reflected on this layer during frontlit illumination. In block 506, a white layer is printed over the lower ink layer as described above. Lastly, an upper non-white ink layer is printed over the white ink layer in the reflective profile setting in block 508.

Accordingly, the image color during direct illumination or reflection mode may still be still optimized since the effect of the lower layer on the color is negligible with inclusion of the white layer. And since the color correction is concentrated in the lower image, the color of the image is also optimized in the backlit setting or transmission mode. That is, the top layer of the image is printed using a profile optimized for reflective lighting and the bottom layer of the image is printed using a profile optimized for backlit lighting. Consequently, implementations of the present disclosure provide a self-adaptive image and accurate colorimetry attributes (e.g., color and brightness) for both viewing conditions.

Implementations of the present disclosure provide a method and system for providing a self-adaptive print image. Moreover, many advantages are afforded by the implementations of the present disclosure. For instance, the present examples enable users to print images that are optimized to be displayed in both backlit and frontlit conditions in a single printing process, thus preserving the printing throughput and allowing business to display advertisements throughout the day in multiple lighting conditions. Furthermore, the present configuration allows for potential energy and cost savings associated with signage advertisements during the day time.

Furthermore, while the disclosure has been described with respect to particular examples, one skilled in the art will recognize that numerous modifications are possible. Moreover, not all components, features, structures, characteristics, etc. described and illustrated herein need be included in a particular example or implementation. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some examples have been described in reference to particular implementations, other implementations are possible according to some examples. Additionally, the arrangement o order of elements or other features illustrated in the drawings or described herein need not be arranged in the particular way illustrated and described. Many other arrangements are possible according to some examples.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A method for building a layered structure including a self-adaptive image, the method comprising:
   depositing a first non-white ink layer on a substrate;
   depositing a white ink layer over the first non-white ink layer; and
   depositing a second non-white ink layer over the white ink layer, wherein the first non-white ink layer and the second non-white ink layer include an image, and the white ink layer transmits a fraction of light from the first non-white ink layer to the second non-white ink layer in a backlit transmission mode such that both the first non-white ink layer and the second non-white ink layer contribute to the color of the image in the backlit transmission mode, and the white ink layer reflects most light incident to the second non-white ink layer in a front lit reflection mode such that the second non-white ink layer provides a majority of the color to the image in the front lit reflection mode and the first non-white ink layer provides a minority of the color of the image in the front lit reflection mode.

2. The method of claim 1, further including:
   printing a first color profile sample on the substrate;
   measuring color attributes associated with the first color profile sample while in a first display mode; and
   computing, by executing an instruction with a processor, an upper layer color profile based on the attribute measurement.

3. The method of claim 2, further including:
   printing a second color profile sample as a first layer and the first color profile sample as a second layer;
   measuring color attributes of the second layer while in a second display mode; and
   computing, by executing an instruction with the processor, a lower layer color profile based on the attribute measurement of the second layer.

4. The method of claim 3, wherein the step of depositing the first non-white ink layer includes printing the ink in accordance with the lower layer color profile.

5. The method of claim 3, wherein the step of depositing the second non-white ink layer includes printing ink in accordance with the upper layer color profile.

6. The method of claim 1, wherein the first non-white ink layer has darker ink than the second non-white ink layer.

7. The method of claim 1, wherein depositing the white ink layer over the first non-white ink layer includes depositing the white ink layer directly on the first non-white ink layer, and wherein depositing the second non-white ink layer over the white ink layer includes depositing the second non-white ink layer directly on the white ink layer.

8. A system for building a layered structure including a self-adaptive image, the system comprising:
   a printer configured to print white and non-white ink on media and
   a processor to instruct the printer to:
      deposit a lower non-white ink layer on the media;
      deposit a white ink layer on the lower non-white ink layer; and
      deposit an upper non-white ink layer on the white-ink layer, wherein the lower non-white ink layer and the upper non-white ink layer include an image, and the white ink layer transmits a fraction of light from the lower non-white ink layer to the upper non-white ink layer in a backlit transmission mode such that both the lower non-white ink layer and the upper non-white ink layer contribute to the color of the image in the backlit transmission mode, and the white ink layer reflects most light incident to the upper non-white ink layer in a front lit reflection mode such that the upper non-white ink layer provides a majority of the color to the image in the front lit reflection mode and the lower non-white ink layer provides a minority of the color of the image in the front lit reflection mode.

9. The system of claim 8, wherein the printer includes a colorimetry measurement module for measuring colorimetry attributes of a profile sample.

10. The system of claim 9, wherein a transmission color profile is determined based on a measurement of colorimetry attributes of a profile sample associated with the lower ink layer and a first display mode.

11. The system of claim 10, wherein the lower layer of the self-adaptive image is printed on the media in accordance with the transmission color profile.

12. The system of claim 9, wherein a reflective color profile is determined based on a measurement of colorimetry attributes of a profile sample associated with the upper ink layer and a second display mode.

13. The system of claim 12, wherein the upper layer of the self-adaptive image is printed on the media in accordance with the reflective color profile.

14. A non-transitory computer readable medium having programmed instructions stored thereon, which when read cause a machine build a layered structure having a self-adaptive image by at least:
   printing a lower non-white ink layer on a substrate;
   printing a white ink layer over the first non-white ink layer; and
   printing an upper non-white ink layer over the white ink layer, wherein the lower non-white ink layer and the upper non-white ink layer include an image, and the white ink layer transmits a fraction of light from the lower non-white ink layer to the upper non-white ink layer in a backlit transmission mode such that both the lower non-white ink layer and the upper non-white ink layer contribute to the color of the image in the backlit transmission mode, and the white ink layer reflects most light incident to the upper non-white ink layer in a front lit reflection mode such that the upper non-white ink layer provides a majority of the color to the image in the front lit reflection mode and the lower non-white ink layer provides a minority of the color of the image in the front lit reflection mode.

15. The non-transitory computer readable medium of claim 14, wherein the programmed instructions further cause the machine to:
   print a color profiling target on the substrate;
   measure colorimetry attributes of the layers in a first mode; and
   determine an upper color profile based on the colorimetry measurement;
   print the color profiling target only on the upper non-white ink layer;
   measure colorimetry attributes of the upper layer in a second display mode; and
   determine a lower color profile based on the colorimetry attributes of the upper layer.

16. The non-transitory computer readable medium of claim 15, wherein the programmed instructions further cause the machine to:
   print the lower ink layer of the self-adaptive image on the substrate in the lower color profile; and
   print the upper ink layer of the self-adaptive image on the substrate in the upper color profile.

* * * * *

UNITED STATES PATENT AND TRADEMARK OFFICE
CERTIFICATE OF CORRECTION

PATENT NO. : 10,321,019 B2
APPLICATION NO. : 15/113585
DATED : June 11, 2019
INVENTOR(S) : Luis Garcia Garcia et al.

It is certified that error appears in the above-identified patent and that said Letters Patent is hereby corrected as shown below:

In the Drawings

In sheet 5 of 5, reference numeral 508, Line 1, delete "LATER" and insert -- LAYER --, therefor.

Signed and Sealed this
Tenth Day of September, 2019

Andrei Iancu
*Director of the United States Patent and Trademark Office*